United States Patent
Dewangan et al.

(10) Patent No.: US 9,159,114 B2
(45) Date of Patent: Oct. 13, 2015

(54) TEXTURE DECOMPRESSION FOR GRAPHICS PROCESSORS

(71) Applicant: QUALCOMM Incorporated, San Diego, CA (US)

(72) Inventors: Rakesh Kumar Dewangan, Bangalore (IN); Ajay Nawandhar, Bangalore (IN); Scott William Nolan, Holliston, MA (US); Elina Kamenetskaya, Somerville, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/075,872

(22) Filed: Nov. 8, 2013

(65) Prior Publication Data
US 2015/0131919 A1      May 14, 2015

(51) Int. Cl.
*G06K 9/36* (2006.01)
*G06T 1/20* (2006.01)
*G06T 9/00* (2006.01)
*G06T 15/04* (2011.01)
*G06T 11/00* (2006.01)
*G06K 9/46* (2006.01)

(52) U.S. Cl.
CPC ... *G06T 1/20* (2013.01); *G06T 9/00* (2013.01); *G06T 11/001* (2013.01); *G06T 15/04* (2013.01)

(58) Field of Classification Search
CPC ....... H04N 7/30; H04N 7/50; H04N 7/26244; H04N 7/26313; H04N 7/26106; H04N 7/26335; H04N 7/26271
See application file for complete search history.

(56) References Cited

U.S. PATENT DOCUMENTS

| | | | |
|---|---|---|---|
| 6,243,081 B1 * | 6/2001 | Goris et al. | 345/555 |
| 6,879,266 B1 | 4/2005 | Dye et al. | |
| 7,372,990 B2 * | 5/2008 | Yamauchi et al. | 382/166 |
| 7,683,910 B2 * | 3/2010 | Lu et al. | 345/582 |
| 7,978,921 B1 | 7/2011 | Donovan | |
| 7,983,498 B1 * | 7/2011 | Donovan | 382/235 |
| 8,094,164 B1 | 1/2012 | Toksvig et al. | |
| 8,542,932 B2 * | 9/2013 | Furuta | 382/232 |
| 2009/0160857 A1 | 6/2009 | Rasmusson et al. | |
| 2013/0016224 A1 * | 1/2013 | Davis | 348/192 |
| 2014/0327668 A1 * | 11/2014 | Strom et al. | 345/419 |

* cited by examiner

*Primary Examiner* — Amir Alavi
(74) *Attorney, Agent, or Firm* — Arent Fox LLP (57) ABSTRACT

Various apparatuses and methods are disclosed for processing texture data compressed with a first compression algorithm and texture data compressed with a second compression algorithm. A processing system may be used to determine whether the compressed texture data is compressed with the first or second compression algorithm, and process the compressed texture data using a decompression algorithm corresponding to the compression algorithm used to compress the texture date.

13 Claims, 5 Drawing Sheets

TEXTURE DECOMPRESSION FOR GRAPHICS PROCESSORS

BACKGROUND

1. Field

The present disclosure relates generally to graphics processors, and more particularly, to texture decompression for graphics processors.

2. Introduction

Graphics processors are commonly used to generate three dimensional (3D) graphic images for a variety of multimedia devices. These processors often include dedicated circuitry configured to process graphics data stored in memory to create 3D images in a frame buffer for presentation to a display. The 3D images created by the graphics processor generally comprise a geometric object or polygon with a texture applied to the surface. The graphics processor may also perform other functions such as translation and rotation of vertices into different coordinate systems and shading to produce the appropriate levels of light and colors within an image.

Today, there is an ever increasing demand for more textures with higher resolution to improve the aesthetics of graphic imagery. This demand has grown in step with advancements in processor technology. However, memory technology has grown at a slower rate. As a result, graphic designers are constantly challenged to provide enough memory bandwidth to exploit the full processing capabilities of modern processors.

Texture compression techniques are widely used by graphics processors to meet these challenges. Texture compression involves the storing texture data in a compressed format in memory. Decompression of the texture data is done by a processor before the texture is applied to the surface of an object. Today, there are various compression formats that are supported by graphics processors for texture compression. Block compression is one such technique. There are seven standard block compression algorithms for 3D graphics, which are referred to as BC1 through BC7. Currently, different hardware configurations are required to support different compression algorithms. Accordingly, there is a need in the art for a single hardware solution capable of decompressing texture compressed with different algorithms.

SUMMARY

Aspects of an apparatus for processing texture data compressed with a first compression algorithm and texture data compressed with a second compression algorithm different from the first compression algorithm are disclosed. The apparatus includes a processing system configured to determine whether the compressed texture data is compressed with the first or second compression algorithm, and process the compressed texture data using a decompression algorithm corresponding to the compression algorithm used to compress the texture date.

Aspects of an apparatus for processing texture data compressed with a first compression algorithm and texture data compressed with a second compression algorithm different from the first compression algorithm are disclosed. The apparatus includes means for determining whether the compressed texture data is compressed with the first or second compression algorithm, and means for processing the compressed texture data using a decompression algorithm corresponding to the compression algorithm used to compress the texture date.

Aspects of a method for processing texture data compressed with a first compression algorithm or second compression algorithm different from the first compression algorithm are disclosed. The method comprises determining whether the compressed texture data is compressed with the first or second compression algorithm, and processing the compressed texture data using a decompression algorithm corresponding to the compression algorithm used to compress the texture date.

It is understood that other aspects of apparatus and methods will become readily apparent to those skilled in the art from the following detailed description, wherein various aspects of apparatuses, methods and articles of manufacture are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatus and methods will now be presented in the detailed description by way of example, and not by way of limitation, with reference to the accompanying drawings, wherein.

In accordance with common practice, some of the drawings may be simplified for clarity. Thus, well-known structures and components may be shown in block diagram form, or omitted entirely, in order to avoid obscuring the various concepts presented throughout this disclosure.

DETAILED DESCRIPTION

Various aspects of the apparatuses and methods will be described more fully hereinafter with reference to the accompanying drawings. These apparatuses and methods may, however, be embodied in many different forms by those skilled in the art and should not be construed as limited to any specific apparatus or method presented herein. Rather, these aspects are provided so that this disclosure will be thorough and complete, and will fully convey the scope of the invention to those skilled in the art. Based on the teachings herein, one skilled in the art should appreciate that the scope of the invention is intended to cover any aspect presented in this disclosure, whether implemented independently of or combined with any other aspect presented in this disclosure. For example, an apparatus may be implemented or a method may be practiced using any number of aspects set forth herein. In addition, an apparatus or method may be implemented using other structure and/or functionality in addition to or instead of other aspects presented in this disclosure. Accordingly, the claims should not be limited to the various aspects of the apparatuses and methods presented throughout this disclosure, but should be accorded the full scope consistent with the language of claims.

The term "apparatus" shall be construed to include any integrated circuit or system, or any portion of an integrated circuit or system (e.g., blocks, modules, components, circuits, elements, or the like). By way of example, the term "apparatus" may be used to refer to a graphics processor, or any portion of a graphics processor (e.g., a processing system for decompressing compressed texture data). The term "apparatus" shall also be construed to include any intermediate product where an integrated circuit or system is combined with other integrated circuits or systems (e.g., a video card, a motherboard, etc.) or any end product (e.g., mobile phone, personal digital assistant (PDA), desktop computer, laptop computer, palm-sized computer, tablet computer, work station, game console, media player, computer based simulators, or the like). The term "method" shall similarly be construed to include the operation of any integrated circuit or system, or any portion of an integrated circuit or system, or any intermediate product or end product, or any step, process, algorithm, or the like, or any combination thereof performed by such integrated circuit or system (or portion thereof), intermediate product, or end product.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. Also, unless stated otherwise a set of elements can comprise one or more elements. In addition, terminology of the form "at least one of: A, B, or C" used in the description or the claims means "A or B or C or any combination of these elements."

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of the stated features, integers, steps, operations, elements, and/or components, but do not preclude the presence or addition of one or more other features, integers, steps, operations, elements, components, and/or groups thereof.

Various aspects of graphics processing presented throughout this disclosure may be implemented in various forms of hardware. By way of example, such aspects may be implemented, either alone or in combination, as an integrated circuit, or as part of an integrated circuit. The integrated circuit may be a graphics processing unit (GPU), a microprocessor, a digital signal processor (DSP), an application specific integrated circuit (ASIC), or any other suitable integrated circuit. The integrated circuit may be integrated with other chips, discrete circuit elements, and/or other components as part of either an intermediate product (e.g., a video card, motherboard, etc.) or an end product. The end product can be any suitable product that performs graphics processing, including by way of example, mobile phones, personal digital assistants (PDAs), desktop computers, laptop computers, palm-sized computers, tablet computers, work stations, game consoles, media players, computer based simulators, and the like.

Several aspects of graphics processing will be presented in the context of an embedded system within a larger apparatus. However, as those skilled in the art will readily appreciate, such aspects of graphics processing may be embedded in other apparatuses not presented in this disclosure or may be implemented as a stand alone apparatus. According any reference to a specific apparatus with embedded graphics processing is intended only to illustrate exemplary applications of graphics processing with the understanding that various aspects of graphics processing presented throughout this disclosure have a wide range of applications.

Figure 1:
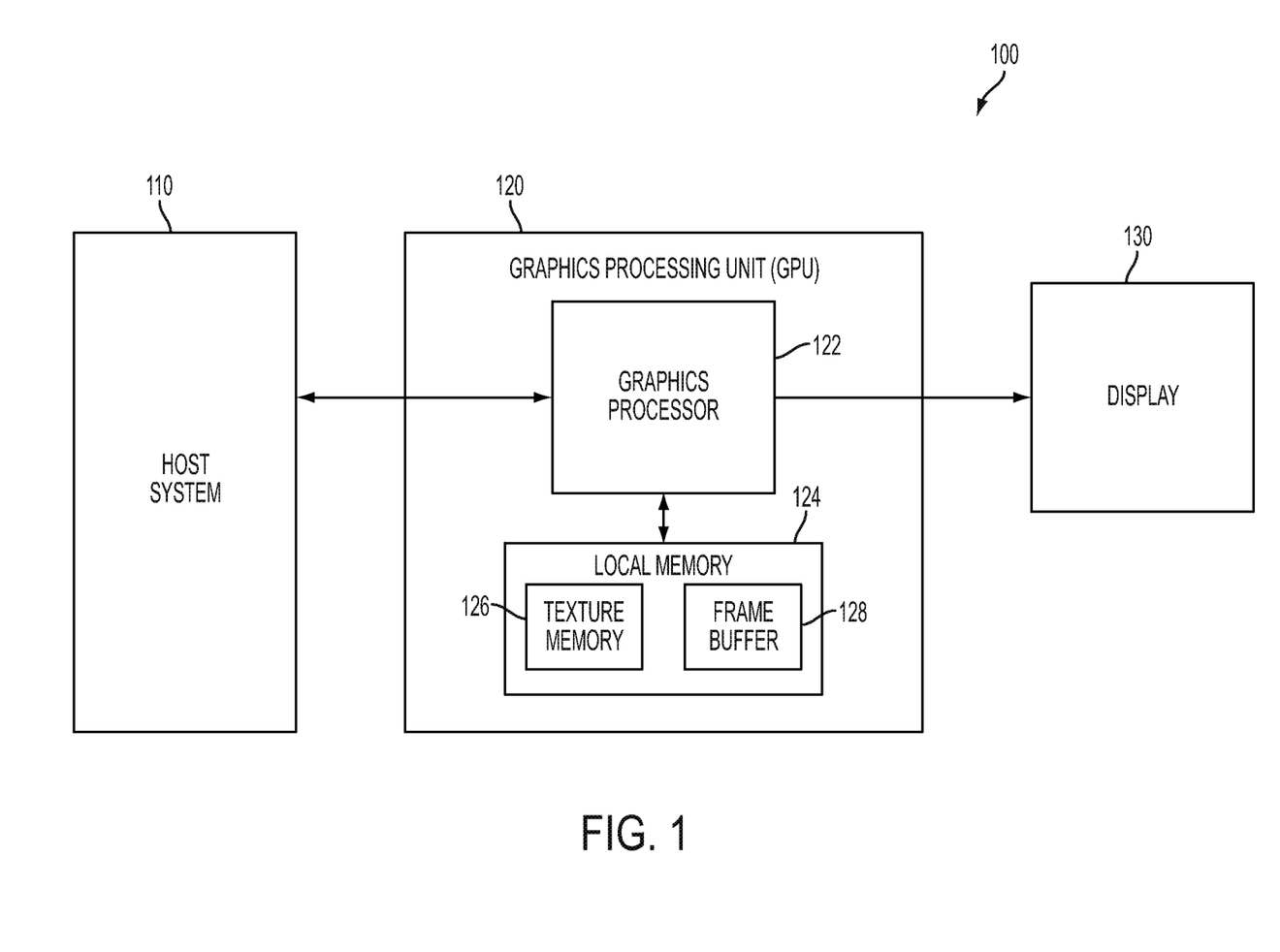
FIG. 1 is a block diagram illustrating an example of an apparatus with embedded graphics processing.

FIG. 1 is a block diagram illustrating an example of an apparatus with embedded graphics processing. As mentioned earlier in this disclosure, the apparatus may be a mobile phone, personal digital assistants (PDA), desktop computer, laptop computer, palm-sized computer, tablet computer, work station, game console, media player, computer based simulator, or the like. The apparatus 100 is shown with a host system 110, a graphics processing unit (GPU) 120, and a display 130. The GPU 120 is shown with a graphics processor 122 and local memory 124. Local memory 124 is used to store compressed texture data 126 and a frame buffer 128, as well as program instructions and other data.

The host system 110 may include a central processing unit (CPU) (not shown) that executes software programs stored in system memory (not shown) to manage the general operation of the apparatus 100. The host system 110 may include other modules or units that are likewise not shown to provide additional functionality. By way of example, the host system 110 may include a transceiver to allow wireless or wired communication with another apparatus or a remote network and a user interface to enable user control of the apparatus 100.

The host system 110 may provide an interface between the GPU 120 and various graphics software programs supported by the host system 110. The GPU 120 may be configured to fetch program instructions from the host system 110 and load those instructions into local memory 124 for execution by the graphics processor 122. The GPU 120 may be further configured to fetch data from the host system 110. The data may be processed by a graphics pipeline within the graphics processor 122 or written to local memory 124. In some embodiments, the host system 110 may compress the texture data. Storing the texture data in a compressed format reduces the bandwidth required to retrieve the texture data from memory.

In a manner to be described in greater detail later, the graphics processor 122 may be used to perform various graphics processing functions that processes the data stored in local memory 124 to create graphic images in a frame buffer 128. The frame buffer 128 may then provide the rendered images to a display 130. Alternatively, or in addition to, the processed data from the graphics processor 122 may be output to a recording device, written to a peripheral device (e.g., disk drive, tape, compact disk, or the like), or transmitted to a remote apparatus via the host system 110.

The graphics processor 122 may be implemented with one or more processors. A "processor" as used throughout this disclosure shall be construed broadly to include general-purpose and special-purpose processors (e.g., microprocessors, microcontrollers, DSP processors, and other circuitry that can execute software), or dedicated hardware (e.g., FPGAs, PLDs, controllers, state machines, gated logic, discrete hardware components, etc.), or any combination thereof.

Software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by a processor. By way of example, and not limitation, such machine-readable media can comprise RAM, SRAM, DRAM, SDRAM, ROM, PROM, EPROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

In the described embodiment, the GPU 120 is shown as part of the apparatus 100 separate from the host system 110. However, as those skilled in the art will readily appreciate, the GPU 120, or any portion thereof, may be external to the apparatus 100. Alternatively, or in addition to, the GPU 120, or any portion thereof, may be integrated into the host system 110. The local memory 124 is shown as part of the GPU 120 separate from the graphics processor 122. However, as those skilled in the art will readily appreciate, the local memory 124, or any portion thereof, may be external to the GPU 120. By way of example, the local memory 124, or any portion thereof, may be integrated into the host system 110, or located elsewhere in the apparatus 100, or reside outside the apparatus 100, or be distributed across various entities in and/or outside the apparatus 100. Alternatively, or in addition to, the local memory 124, or any portion thereof, may be integrated into the graphics processor 122, such as the case may be with cache and/or general register files.

Figure 2:
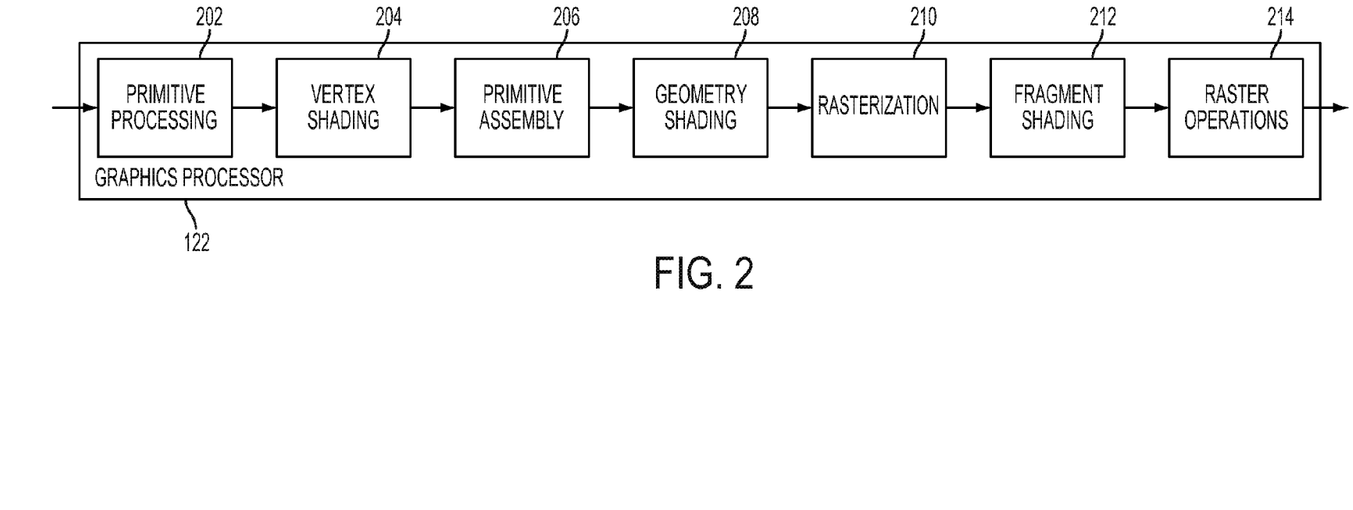
FIG. 2 is a block diagram illustrating an example of a graphics processor.

FIG. 2 is a block diagram illustrating an example of a graphics processor. The graphics processor 122 is shown with a graphics pipeline that provides various processing functions related to three dimensional (3D) graphics. These functions include, by way of example, primitive processing 202, vertex shading 204, primitive assembly 206, geometry shading 208, a rasterization 210, fragment shading 212, and raster operations 214. These functions may be implemented in hardware, software, or any combination thereof. By way of example, a function within the graphics pipeline, or any portion thereof, may be implemented with dedicated hardware and/or hardware shared by other functions performed in the graphics pipeline. Alternatively, or in addition to, a function, or any portion thereof, may be implemented with one or more programmable processors configured to execute instructions contained in software programs residing in local memory 124 or elsewhere. Those skilled in the art will be best suited to implement the described functionality based on the particular application and design constraints imposed on the overall apparatus.

The graphics pipeline begins with primitive processing 202. Modern graphics processors operate with primitives which are geometric shapes (e.g., points, lines, triangles, polygons, etc.) that can be combined to render a three dimensional (3D) image. Primitive processing 202 is the process of producing vertices for the primitives making up the 3D object. The vertices may then be transformed from a (3D) virtual space coordinate system to a two dimensional (2D) display coordinate system by a vertex shading 204 process. In some embodiments of a graphics pipeline, the vertex shading 204 process may also be used to manipulate other properties of the vertices including, by way of example, lighting, color and texture coordinates. The vertices may then be assembled into individual primitives by a primitive assembly 206 process. Next, a geometry shading 208 process may be performed by the graphics pipeline to change some of the geometries of the primitives. The primitives may then be converted to a raster image (i.e., pixels) by a rasterization 210 process. A fragment shading 212 process may be used to provide texture mapping, perspective correction, color, lighting, shadows, shading, and the like to the pixels. Various other raster operations 214 may be performed by the graphics pipeline including, by way of example, depth, blending, and dither processing. The processed pixel images, or rendered images, may then be output from the graphics pipeline and stored in the frame buffer 128 for presentation to the display 130 (see FIG. 1). Alternatively, or in addition to, the rendered images may be output to a recording device, written to a peripheral device (e.g., disk drive, tape, compact disk, or the like), or transmitted to a remote apparatus via the host system 110 (see FIG. 1).

As discussed above, the fragment shading function 212 may include the process of texture mapping to the surface of graphics objects. However, this process, or any portion thereof, may be implemented elsewhere in the graphics pipeline, or elsewhere in or external to the apparatus. Alternatively, the texture mapping process, or any portion thereof, may be a stand alone circuit that is used by the graphics pipeline. Those skilled in the art will be best equipped to determine the most suitable implementation of the texture mapping process depending on the particular application and overall design constraints imposed on the overall system.

The texture data may be stored in local memory 126 or elsewhere in a compressed format to provide sufficient memory bandwidth to take advantage of the full processing capabilities of the graphics processor 122 (see FIG. 1). Decompression of the texture data may be done inside the graphics pipeline before mapping to the surface of the object. As discussed earlier in the background portion of the disclosure, there are various compression algorithms that are supported by graphics processors for texture compression. One family of compression algorithms that are commonly used are known as "Block Compression" (BC) algorithms. There are currently seven block compression algorithm that are commonly used today for graphics processing, which are referred to as BC1 through BC7.

Block compression utilizes various compression algorithms that operate on blocks of texture elements. The size of the blocks are very small (e.g., 4×4 blocks of elements) to limit the color variation within each block. By limiting the color variation within a block, the texture elements can be represented by a small color palette. The palette may be further compressed by assuming that all colors in the palette are evenly spaced along a line segment in RGB space. Each block can then be represented by the endpoints of that line segment with each texture element being assigned an index that may be used to interpolate between the two endpoints to reconstruct the color for that texture element.

BC6 and BC7 are two new compression algorithms introduced by Microsoft® in its DirectX (DX) 11 application programming interface (API). These compression algorithms support a number of different modes. Each mode may have a different format in terms of palette size and endpoint precision. This makes these compression algorithms more adaptable to the content of the image. By way of example, low precision endpoints with large color palettes may be more suitable for some blocks while higher precision endpoints with smaller color palettes may be more suitable for others.

The endpoints may also be compressed. By way of example, BC6 uses a transform function where the endpoints are derived from a reference endpoint. BC7, on the other hand, uses a compression technique known as a "P-bit" operation where the P-bit represents a shared least significant bit for the endpoints.

BC6 and BC7 may also utilize the concept of partitioning to allow multiple line segments to be used with each block. Each texture element within a block may be assigned a different line segment. The index for that texture element may then be used to interpolate between the endpoints for the assigned line segment to reproduce the color. This approach can improve image quality in cases where the colors within a block do not track well with a single line in RGB space.

Finally, BC7 provides two distinct line segments for different channels: one line segment for color (i.e., RGB) and another line segment for alpha. This approach is well equipped to deal with the different spatial distributions of the channels. In addition, BC7 provides the ability to swap channels (or rotate) by allowing the alpha channel to be swapped with the red, green or blue channel. This effectively allows any of the four channels to use a distinct line segment from the rest.

Figure 3:
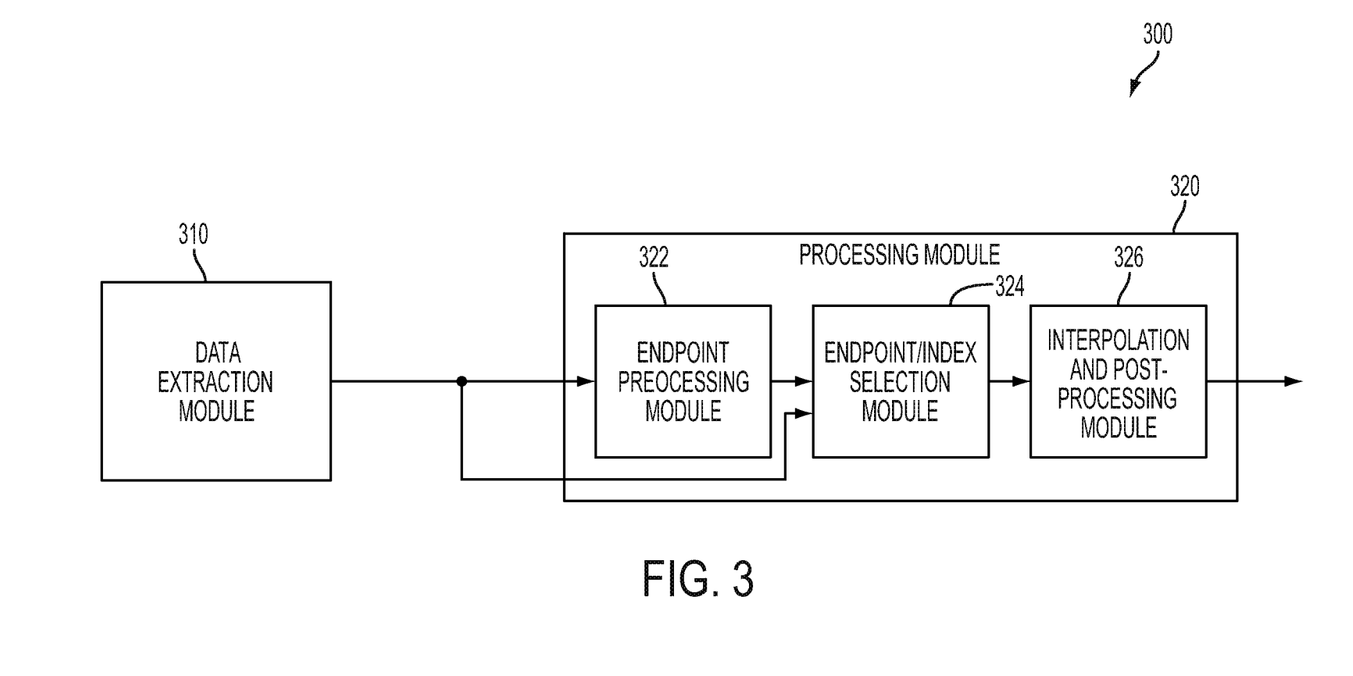
FIG. 3 is a block diagram illustrating an example of a decompression engine capable of handling multiple compression algorithms.

FIG. 3 is a block diagram illustrating an example of a decompression engine capable of handling multiple compression algorithms. In this example, the decompression engine 300 is capable of handling compressed texture data compressed with a first compression algorithm, as well as compressed texture data compressed with a second compression algorithm which is different from the first algorithm. However, in other embodiments, the decompression engine 300 may be configured to handle compressed texture data compressed with first, second, third and even more different compression algorithms.

The decompression engine 300 may use various processing modules to decompress compressed texture data stored in local memory 124 (see FIG. 1) or elsewhere. These modules, or any portions thereof, may be implemented with the same processor used to implement the graphics pipeline. Alternatively, these modules, or any portions thereof, may be implemented in a processor separate from the graphics pipeline. Those skilled in the art will be best suited to implement the described functionality based on the particular application and design constraints imposed on the overall apparatus.

The decompression engine 300 is shown with a data extraction module 310 and a processing module 320. The data extraction module 310 provides a means for determining whether the compressed texture data is compressed with a first or second compression algorithm and the processing module 320 provides a means for processing the compressed texture data using a decompression algorithm corresponding to the compression algorithm used to compress the texture date. The processing module 320 may be implemented with several sub-modules including an endpoint processing module 322, an endpoint/index selection module 324, and a interpolation and post processing module 326. The endpoint processing module 322 provides a means for obtaining one or more endpoint pairs from the compressed texture data. The endpoint/index selection module 324 provides a means for selecting one of the one or more endpoint pairs for each texture element and a means for selecting a corresponding index. The interpolation and post processing module 326 provides a means for obtaining decompressed texture data for each texture element from the selected endpoint pair and the index.

Figure 4:
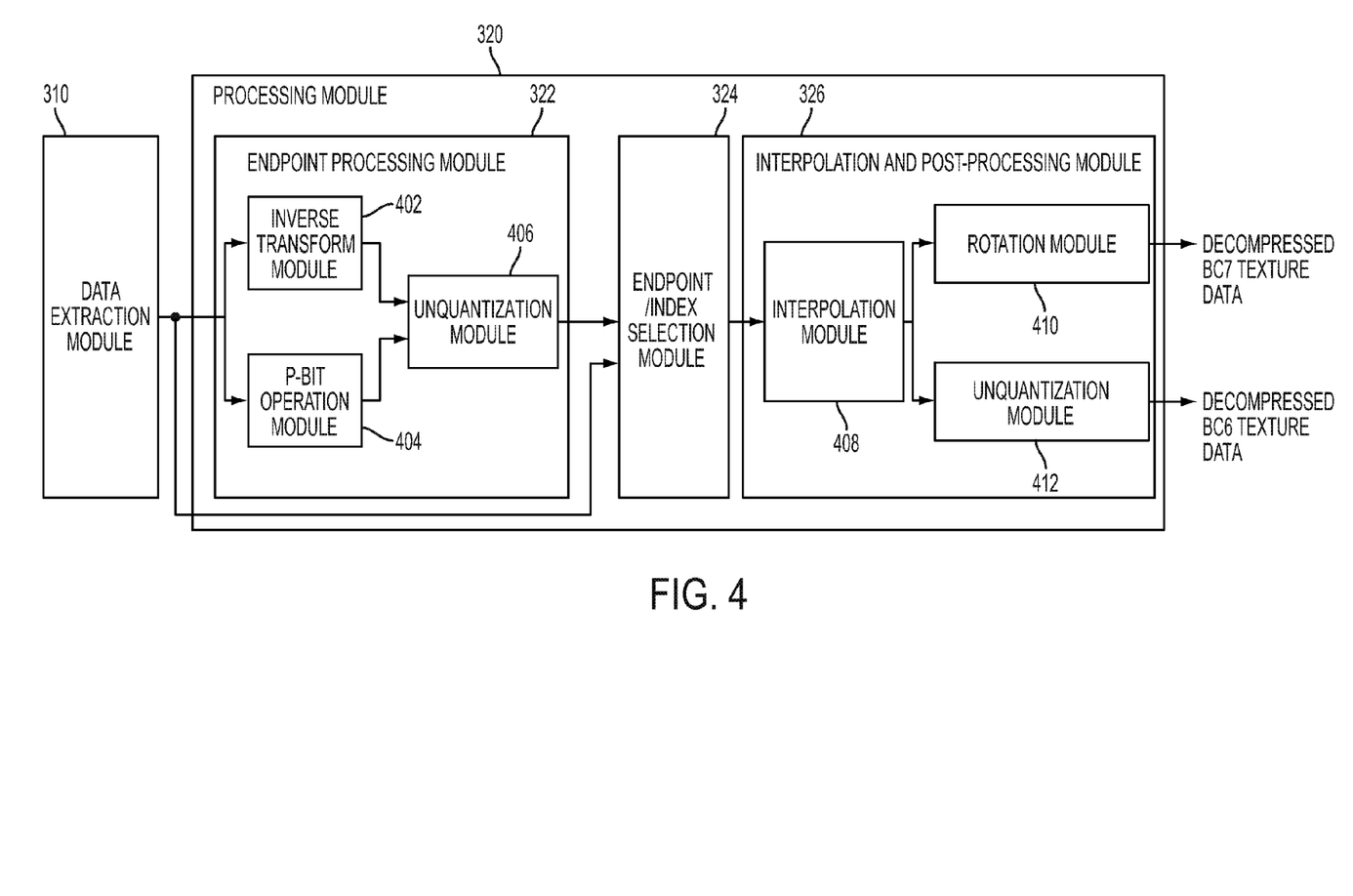
FIG. 4 is a block diagram illustrating a more detailed example of a decompression engine capable of handling multiple compression algorithms.

FIG. 4 is a block diagram illustrating a more detailed example of a decompression engine capable of handling multiple compression algorithms. In this example, the first and second compression algorithms may be BC6 and BC7 compression algorithms, however, the first and second compression algorithms may be different compression algorithms in other embodiments.

The data extraction module 310 may be configured to retrieve compressed texture data from local memory 124 (see FIG. 1), or elsewhere, in the form of block data. Each block of compressed texture data may include mode bits, compressed endpoint pairs, compressed indices, and partition bits. Texture data compressed with a BC 7 algorithm may also include a P-bit and rotation bits, in the case where separate color and alpha channels are provided.

The data extraction module 310 may be configured to determine the compression algorithm was to compress the texture data by examining the format of the block, or certain portions thereof. By way of example, the format for each compression algorithm may have different modes, and may have a different number of bits representing the compressed endpoints, compressed indices, and partition bits. The sequence of the bits representing the mode, compressed endpoints, compressed indices and partition bits may also be different. The presence of a P-bit or rotation bits would indicate that the compressed texture data is compressed with a BC7 compression algorithm. The differences in modes and format may be used by the data extraction module 310 to determine the compression algorithm used to compress the block of texture data retrieved from local memory or elsewhere.

Once the data extraction module 310 determines the compression algorithm, it can extract various types of texture data contained in the block (e.g., compressed endpoint pairs, compressed indices, partition bits, and to the extent provided a P-bit and rotation bits). The texture data extracted from the block may be provided by the data extraction module 310 to the processing module 320 along with an indicator signal which indicates the compression algorithm used to compress the block of texture data.

As explained earlier, the processing module 320 may include an endpoint processing module 322. The compressed endpoint pairs along with the indicator signal may be provided to the endpoint processing module 322. The endpoint processing module 322 may be used to demultiplex the compressed endpoint pairs between two different decompression paths depending on the state of the indicator bit. When the state of the indicator bit indicates texture data compressed with a BC6 compression algorithm, the compressed endpoints may be provided to an inverse transform module 402 for decompression. When the state of the indicator bit indicates texture data compressed with of a BC7 compression algorithm, the compressed endpoint pairs may be provided to a P-bit operation module 404 along with the P-bit for decompression.

The inverse transform module 402 may be used to decompress the endpoint pairs that were stored using a BC6 compression algorithm. As discussed earlier in the disclosure, BC6 uses a transform function where each end point pair is derived from a reference endpoint. The inverse transform module 402 may use the reference endpoints to recover the endpoint pairs. Depending on the mode, a sign extension operation may also be required.

The P-bit operation module 404 may be used to decompress the endpoint pairs that were stored using a BC7 compression algorithm. The P-bit operation may be performed by appending a P-bit to each of the compressed endpoint pairs to recover the endpoint pairs.

The endpoint processing module 322 further provides a multiplexing function by switching the output connection from the two different decompression paths to the input of an unquantization module 406. As discussed earlier in the disclosure, the precision of the endpoints may vary depending on the mode. The unquantization module 406 may be used to estimate the original endpoint pairs to full precision.

The processing module 320 may also include an endpoint/index selection module 324. The endpoint/index selection module 324 may be used to select the endpoint pair and the corresponding index for each texture element in the block based on the partition bits. The endpoint/index selection module 306 may be implemented with a look-up table (not shown) or by any other suitable means. The look-up table may be implemented with a PROM or some other memory device. In at least one embodiment, the look-up table may store various spatial partitioning patters for a block of texture data. The look-up table may be addressed by the partition bits. The spatial partitioning pattern for any given set of partition bits assigns an endpoint pair to each texture element in the block. As discussed earlier, each endpoint pair represents a line segment palette. The palette index for each texture element may be determined from the compressed indices provided by the data extraction module 302.

The processing module 320 may also include an interpolation and post processing module 326. The interpolation and post processing module 326 may include an interpolator module 408. The interpolator module 408 may be used to determine the texture data for each texture element from the assigned line segment's palette and the palette index. This may be achieved by interpolating the endpoint pairs with their corresponding palette index for each texture element in the block to produce a series of interpolation values representing the texture data for the block. In some embodiments, a linear interpolation may be used, but a more complex interpolation may be used in other embodiments.

The interpolation values from the interpolator module 408 may be demultiplexed between two different decompression paths depending on the state of the indicator bit. When the state of the indicator bit indicates texture data compressed with a BC7 compression algorithm, the interpolation values may be provided to a rotation module 410. The rotation module 410 may be used to swap channels based on the rotation bits provided by the data extraction module 302. As discussed earlier in the disclosure, the alpha channel may be swapped with the red, green or blue channel. When the state of the indicator bit indicates texture data compressed with of a BC6 compression algorithm, the interpolation values may be provided to a final unquantization module 412. The final unquantization module 412 provides a scaling function to provide a full RGB output range that extends from a negative value to a positive value that is centered at zero.

Figure 5:
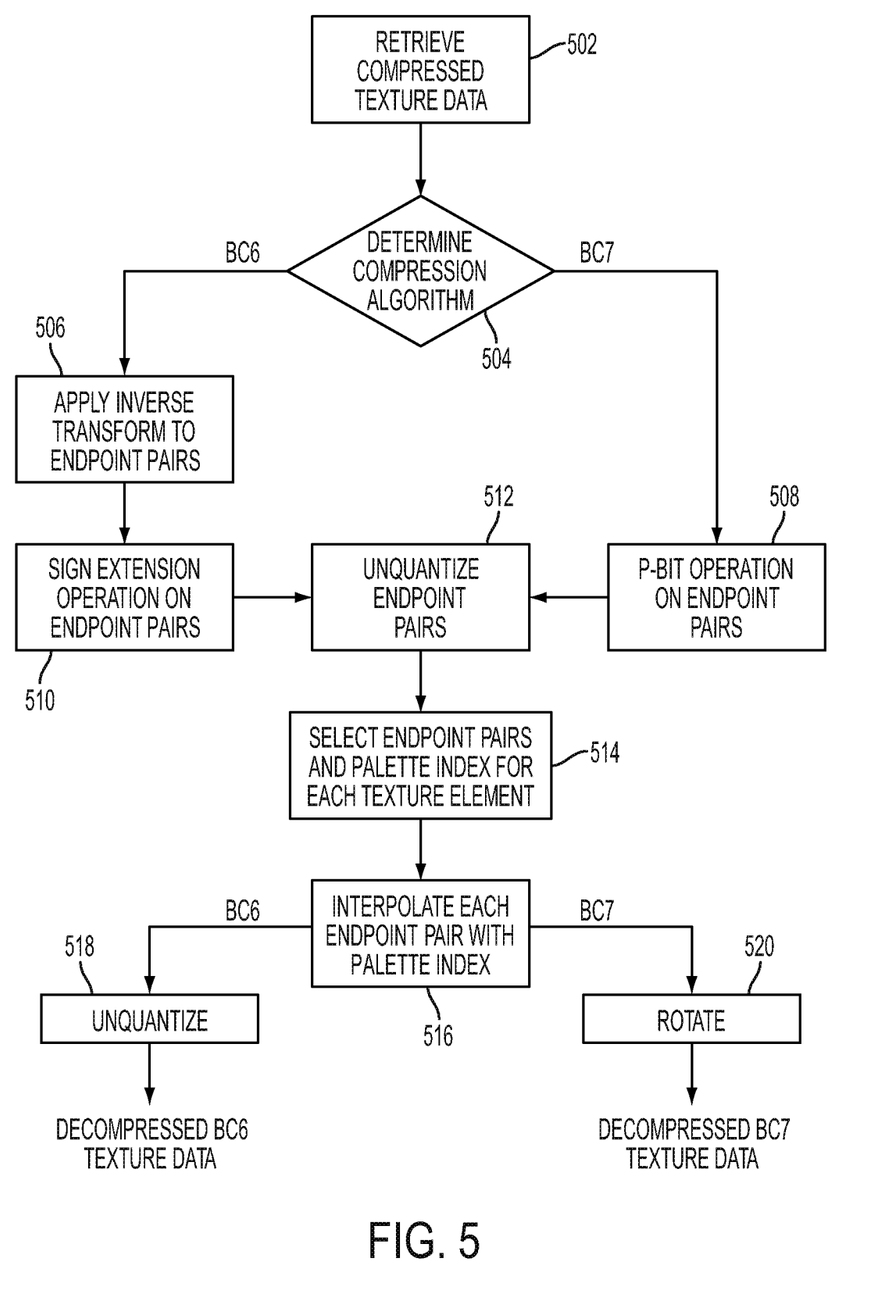
FIG. 5 is a block diagram illustrating a flow diagram of a decompression engine capable of handling multiple compression algorithms.

FIG. 5 is a block diagram illustrating a flow diagram of a decompression engine capable of handling multiple compression algorithms. In this example, the first and second compression algorithms may be BC6 and BC7 compression algorithms, however, the first and second compression algorithms may be different compression algorithms in other embodiments.

In block 502, compressed texture data is retrieved from local memory 124 (see FIG. 1), or elsewhere, in the form of block data. As explained earlier in the disclosure, each block of compressed texture data may include mode bits, compressed endpoint pairs, compressed indices, and partition bits. Texture data compressed with a BC 7 algorithm may include a P-bit and rotation bits, in the case where separate color and alpha channels are provided.

In block 504, the compression algorithm used to compress the texture data is determined by examining the format of the compressed texture data, or certain portions thereof. In this example, the compressed endpoint pairs may be provided to block 506 if a BC6 compression was used to compress the texture data. Otherwise, in the case where a BC7 compression algorithm was used to compress the texture data, the compressed endpoint pairs may be provided to block 508.

In block 506, an inverse transform function may be applied to the compressed endpoint pairs. As discussed earlier in the disclosure, BC6 uses a transform function where each end point pair is derived from a reference endpoint. The inverse transform may use the reference endpoints to recover an end point pair for each line segment in the block. Depending on the mode, a sign extension operation may also be applied in block 510.

In block 508, a P-bit operation may be applied to the compressed endpoint pairs. As explained earlier in the disclosure, the P-bit operation may be performed by appending a P-bit to each of the compressed endpoint pairs to recover an end point pair for each line segment used in the block.

In block 512, the endpoint pairs may be unquantized. As discussed earlier in the disclosure, the precision of the endpoints may vary depending on the mode. The unquantization process may be used to estimate the original endpoint pairs to full precision.

In block 514, the endpoint pair and the corresponding index for each texture element in the block may be selected based on the partition bits. As discussed earlier, each endpoint pair represents a different line segment palette. The palette index for each texture element may be determined from the compressed indices.

In block 516, the endpoint pair for each texture element in the block may be interpolated with its corresponding palette index to produce an interpolation value representing the texture data for that element. In some embodiments, a linear interpolation may be used, but a more complex interpolation may be used in other embodiments. The interpolation values for the texture elements in the block may be provided to block 518 if the texture data was originally compressed with a BC6 compression algorithm. Otherwise, in the case of texture data compressed with a BC7 compression algorithm, the interpolation values may be provided to block 520.

In block 518, the interpolation values are unquantized. The unquantization of the interpolation values provide a scaling function that results in a full RGB output range that extends from a negative value to a positive value that is centered at zero. The output from block 518 is the uncompressed texture data for a block of texture elements.

In block 520, the interpolation values may be rotated, or the channels swapped, based on the rotation bits. As discussed earlier in the disclosure, the alpha channel may be swapped with the red, green or blue channel. The output from block 520 is the uncompressed texture data for a block of texture elements.

It is understood that any specific order or hierarchy of blocks described in the context of testing an integrated circuit is being presented to provide an example of a method for testing an integrated circuit. Based upon design preferences, it is understood that the specific order or hierarchy of blocks may be rearranged while remaining within the scope of the invention.

The previous description is provided to enable any person skilled in the art to fully understand the full scope of the disclosure. Modifications to the various exemplary embodiments disclosed herein will be readily apparent to those skilled in the art. Thus, the claims should not be limited to the various aspects of the disclosure described herein, but shall be accorded the full scope consistent with the language of claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. An apparatus for processing texture data compressed with a first compression algorithm and texture data compressed with a second compression algorithm different from the first compression algorithm, comprising:
 a processing system configured to:
  determine whether the compressed texture data is compressed with the first or second compression algorithm;
  process the compressed texture data using a decompression algorithm corresponding to the compression algorithm used to compress the texture data;
  process the compressed texture data by obtaining one or more endpoint pairs from the compressed texture data; and
  obtain the one or more endpoint pairs using an inverse transform if the compressed texture data is compressed with the first compression algorithm, and using a p-bit operation if the compressed texture data is compressed with the second compression algorithm.

2. The apparatus of claim 1 wherein the processing system is further configured to obtain the one or more endpoint pairs by unquantizing the decompressed texture data.

3. The apparatus of claim 1 wherein the processing system is further configured to select one of the one or more endpoint pairs for a texture element.

4. The apparatus of claim 1 wherein the processing system is further configured to process the compressed texture data by obtaining decompressed texture data for a texture element from an endpoint pair and an index.

5. The apparatus of claim 4 wherein the processing system is further configured to obtain the decompressed texture data for the texture element by interpolating the endpoint pair with the index to obtain an interpolated value.

6. The apparatus of claim 5 wherein the processing system is further configured to obtain the decompressed texture data for the texture element by unquantizing the interpolated value if the compressed texture data is compressed with the first compression algorithm, and by selectively rotating the interpolated value if the compressed texture data is compressed with the second compression algorithm.

7. An apparatus for processing texture data compressed with a first compression algorithm and texture data compressed with a second compression algorithm different from the first compression algorithm, comprising:
 means for determining whether the compressed texture data is compressed with the first or second compression algorithm; and
 means for processing the compressed texture data using a decompression algorithm corresponding to the compression algorithm used to compress the texture data,
 wherein the means for processing comprises means for obtaining one or more endpoint pairs from the compressed texture data, and
 wherein the means for obtaining one or more endpoint pairs is configured to obtain the one or more endpoint pairs using an inverse transform if the compressed texture data is compressed with the first compression algorithm, and using a p-bit operation if the compressed texture data is compressed with the second compression algorithm.

8. A method for processing texture data compressed with a first compression algorithm or second compression algorithm different from the first compression algorithm, comprising:
 determining whether the compressed texture data is compressed with the first or second compression algorithm; and
 processing the compressed texture data using a decompression algorithm corresponding to the compression algorithm used to compress the texture data,
 wherein the processing the compressed texture data comprises obtaining one or more endpoint pairs from the compressed texture data, and
 wherein the obtaining one or more endpoint pairs comprises obtaining the one or more endpoint pairs using an inverse transform if the compressed texture data is compressed with the first compression algorithm, and using a p-bit operation if the compressed texture data is compressed with the second compression algorithm.

9. The method of claim 8 wherein the obtaining one or more endpoint pairs further comprises unquantizing the compressed texture data.

10. The method of claim 8 wherein the processing the compressed texture data further comprises selecting one of the one or more endpoint pairs for a texture element.

11. The method of claim 8 wherein the processing the compressed texture data further comprises obtaining decompressed texture data for a texture element from an endpoint pair and an index.

12. The method of claim 11 wherein the obtaining decompressed texture data comprises obtaining the decompressed texture data for the texture element by interpolating the endpoint pair with the index to obtain an interpolated value.

13. The method of claim 12 wherein the obtaining the decompressed texture data comprises obtaining the decompressed texture data for the texture element by unquantizing the interpolated value if the compressed texture data is compressed with the first compression algorithm, and by selectively rotating the interpolated value if the compressed texture data is compressed with the second compression algorithm.

* * * * *